(12) United States Patent
Rawdon

(10) Patent No.: US 12,162,602 B2
(45) Date of Patent: Dec. 10, 2024

(54) SYSTEMS AND METHODS FOR FOLDING WINGS ON AN AIRCRAFT

(71) Applicant: JetZero, Inc., Long Beach, CA (US)

(72) Inventor: Blaine Knight Rawdon, Riverside, CA (US)

(73) Assignee: JetZero, Inc., Long Beach, CA (US)

( * ) Notice: Subject to any disclaimer, the term of this patent is extended or adjusted under 35 U.S.C. 154(b) by 29 days.

(21) Appl. No.: 18/090,173

(22) Filed: Dec. 28, 2022

(65) Prior Publication Data

US 2023/0138789 A1    May 4, 2023

Related U.S. Application Data

(63) Continuation-in-part of application No. 17/502,428, filed on Oct. 15, 2021, now Pat. No. 11,591,066.

(51) Int. Cl.
| | |
|---|---|
| *B64C 3/56* | (2006.01) |
| *B64C 13/40* | (2006.01) |
| *B64C 13/50* | (2006.01) |
| *B64C 39/10* | (2006.01) |

(52) U.S. Cl.
CPC ............ *B64C 3/56* (2013.01); *B64C 13/40* (2013.01); *B64C 13/50* (2013.01); *B64C 2039/105* (2013.01)

(58) Field of Classification Search
CPC ............ B64C 3/56; B64C 2039/105; B64D 2045/0085
See application file for complete search history.

(56) References Cited

U.S. PATENT DOCUMENTS

| | | | |
|---|---|---|---|
| 2,323,640 | A | 7/1943 | Armstrong |
| 7,249,736 | B2 | 7/2007 | Clark |
| 7,789,343 | B2 | 9/2010 | Sarh et al. |
| 9,845,152 | B2 | 12/2017 | Stan |
| 10,214,278 | B2 * | 2/2019 | Briancourt ............... B64C 3/56 |
| 10,287,011 | B2 | 5/2019 | Wolff et al. |
| 10,364,018 | B2 | 7/2019 | Wildschek et al. |
| 10,464,663 | B2 | 11/2019 | Luce |
| 10,933,975 | B2 | 3/2021 | Ratti |
| 11,014,654 | B2 | 5/2021 | Thompson |
| 2003/0080243 | A1 * | 5/2003 | Hoisignton ........... B64C 1/0009 244/13 |
| 2006/0220918 | A1 | 10/2006 | Stockwell et al. |
| 2017/0021911 | A1 * | 1/2017 | Wildschek ............... B64C 3/42 |
| 2017/0203839 | A1 * | 7/2017 | Giannini ............. B64C 29/0033 |
| 2018/0194453 | A1 | 7/2018 | Randall et al. |
| 2020/0023947 | A1 | 1/2020 | Page |
| 2020/0207463 | A1 | 7/2020 | Schuster et al. |
| 2020/0207464 | A1 | 7/2020 | Whitlock et al. |

FOREIGN PATENT DOCUMENTS

| | | |
|---|---|---|
| DE | 202010016892 | 8/2011 |
| WO | 2020234591 | 11/2020 |
| WO | 2021123540 | 6/2021 |

* cited by examiner

*Primary Examiner* — Valentina Xavier
(74) *Attorney, Agent, or Firm* — Caldwell Intellectual Property Law

(57) ABSTRACT

Aspects relate to systems and methods for folding wings on an aircraft. An exemplary system includes a blended wing body, where the blended wing body includes a main body and at least a wing, a hinge located on the at least a wing and configured to allow folding of the at least a wing, an actuation system configured to fold the at least a wing, and a controller configured to control the at least an actuation system.

18 Claims, 7 Drawing Sheets

SYSTEMS AND METHODS FOR FOLDING WINGS ON AN AIRCRAFT

CROSS-REFERENCE TO RELATED APPLICATIONS

This application is a continuation-in-part of Non-provisional application Ser. No. 17/502,428 filed on Oct. 15, 2021 and entitled "SYSTEMS AND METHODS FOR FOLDING WINGS ON AN AIRCRAFT," the entirety of which is incorporated herein by reference.

FIELD OF THE INVENTION

The present invention generally relates to the field of air travel. In particular, the present invention is directed to systems and methods for folding wings on an aircraft.

BACKGROUND

Presently air travel contributes greatly to consumption of fossil fuels and introduction of greenhouse gases to the atmosphere. Advances in efficient aircraft designed to reduce fossil fuel consumption may not work with current airports designed for conventional aircraft. For example, advanced efficient aircraft may not fit at current aircraft terminals.

SUMMARY OF THE DISCLOSURE

In an aspect a system for folding wings on an aircraft includes a blended wing body, where the blended wing body includes a main body and at least a wing, wherein the outboard flight component comprises at least a flight control surface, a hinge located on the at least a wing, wherein the hinge is inboard relative to the outboard flight component, and configured to allow folding of the at least a wing, an actuation system configured to fold the at least a wing, and a controller configured to control the at least an actuation system.

Another aspect relates to a method of folding wings on an aircraft including a blended wing body, where the blended wing body includes a main body and at least a wing. the method includes allowing, using a hinge located on the blended wing body and inboard relative to an outboard flight component of the at least a wing, folding of the at least a wing, wherein the outboard flight component comprises at least a flight control surface, folding, using an actuation system, the at least a wing, and controlling, using a controller, the at least an actuation system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for folding a wing on an aircraft. In an embodiment, an aircraft may include a blended wing body.

Aspects of the present disclosure can be used to fold wings on a blended wing body aircraft. Aspects of the present disclosure can also be used to decrease an effective wingspan of an aircraft while at a terminal of an airport. This is so, at least in part, because contemporary airports have maximum allowable wingspans, aircraft having wingspans beyond this the airport cannot accommodate.

Aspects of the present disclosure allow for use of more efficient blended wing body aircraft with presently designed airports. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 5. Furthermore, there is no intention to be bound by any expressed or implied theory presented in this disclosure.

Figure 1:
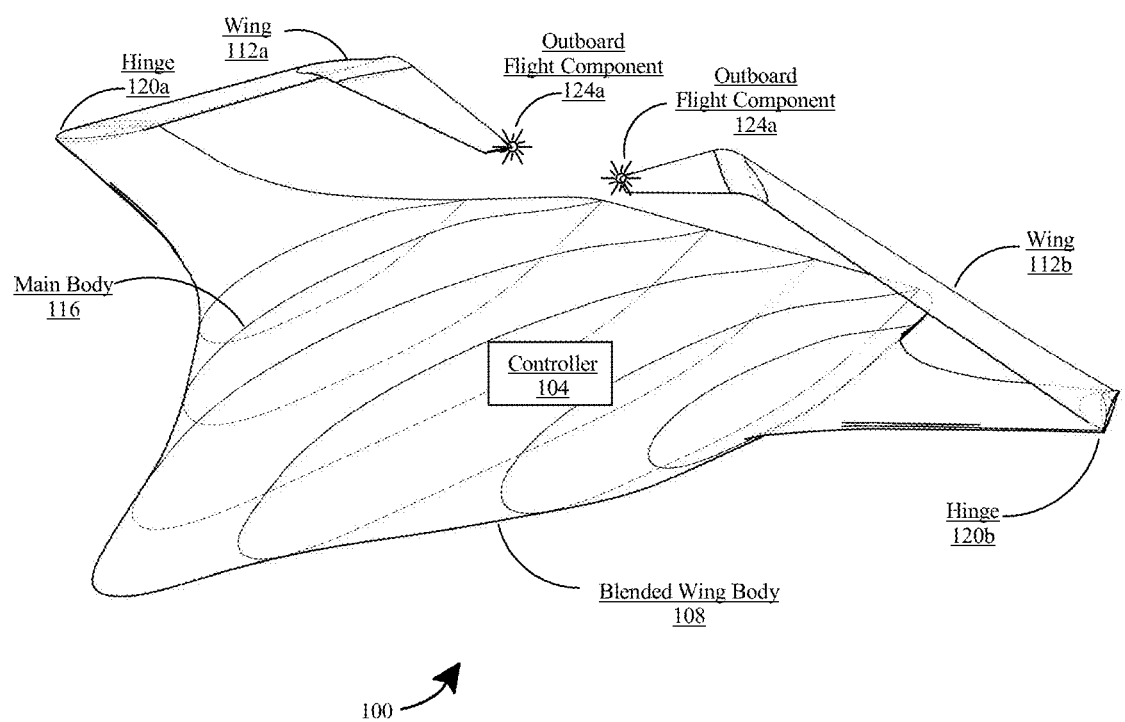
FIG. 1 is a block diagram illustrating an exemplary aircraft with foldable wings.

Referring now to FIG. 1, an exemplary embodiment of an aircraft 100 having a system for folding wings is illustrated. System includes a controller 104. Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, aircraft 100 may include a blended wing body (BWB) 108. Briefly, a blended wing body 108 may be understood as an aircraft 100 body type where no clear boundary exists between wing 120*a-b* and main body 116 substantially at a leading edge of the wings 120*a-b*. A blended wing body 108 may include any blended wing body described in this disclosure and is described in detail in reference to FIG. 5, below. A BWB 108 may be contrasted by a wing tube body which has a clear transition between a tube fuselage and wings. In some cases, a BWB 108 may be contrasted by a flying wing, which effectively has no transition between wing 120*a-b* and body 116, as it theoretically comprises only a wing. In some cases, optimal wingspan in all planes is a coupled or interdependent design parameter. Optimal wingspan may be dependent upon a number of factors, including aircraft weight, drag, propulsor (e.g., engine) size, and the like. Commonly a BWB aircraft 100 may require a wider optimal wingspan than a similarly sized conventional wing tube aircraft. For example, a BWB aircraft 100 of a size suitable for commercial air travel or other functions, such as cargo or military transport, may have an optimal wingspan that exceeds wingspan threshold currently permitted by airports.

With continued reference to FIG. 1, aircraft 100 includes at least a hinge 120*a-b*. As used in this disclosure, a "hinge" is a mechanism that is attached to at least two components and allows for limited movement of the at least two components relative one another. In some cases, a hinge may include a bearing element. In some cases, a hinge may allow for rotation between at least two components, for example over a limited range of motion. In some cases, hinge 120*a-b* may be located on at least a wing 120*a-b*. Alternatively or additionally, in some cases, at least a hinge 112*a-b* may be located within main body 116 and/or a transitional portion between wing 120*a-b* and main body 120. In some cases, because of the nature of a blended wing body 108 precise location of hinge 120*a-b* in regard to wing 120*a-b* and main body 116 may be difficult to ascertain. In part for this reason, any reference to "a hinge located on a wing," within this disclosure, refers a hinge 120*a-b* being located such that a wing is located on at least one side of the hinge 120*a-b*. In some cases, hinge 120*a-b* may be configured to allow folding of at least a wing 120*a-b*. As used in this disclosure, "folding" is an act of moving a component from a first (unfolded) position to a second (folded) position, where when in the first position the component is extended or larger by some measure than when in the second position. Folding may include a rotational motion, a translational motion, or any combination of both rotational and translational motion. In some cases, a location of at least a hinge 120*a-b* may be determined to provide a desired aircraft 100 width. For example in some cases, an aircraft's 100 folded wing width may be selected to ensure that it is less than a maximum permitted wingspan. Maximum permitted wingspan may be determined according to airport class. Thus in some embodiments, folding wings may allow for an aircraft 100 to service more airports by maximizing airport compatibility. In some cases, at least a wing 120*a-b* may be folded while aircraft 100 is on ground, for example before parking the aircraft 100 at a terminal of an airport. In some cases, at least a wing 120*a-b* may be unfolded while aircraft 100 is on ground, for example before take-off and after aircraft has left a terminal. In some embodiments, at least a wing 120*a-b* and blended wing body 108 may have a smooth outer mold line (OML) consistent with a BWB when the at least a wing 120*a-b* is unfolded.

With continued reference to FIG. 1, hinges 120*a-b* may be configured to fold wings 120*a-b* in any direction or manner and may include any hinge arrangement. For example, hinges 120*a-b* may fold at least a wing 120*a-b* upward and inward. Hinge 120*a-b* may be arranged to allow at least a wing 120*a-b* to fold directly inward (and beside) an aircraft 100, see FIG. 2. Hinge 120*a-b* may be arranged to allow wing 120*a-b* to fold directly inward (and over) aircraft 100, see FIG. 1. At least a hinge 120*a-b* may allow at least a wing 120*a-b* to fold aftward (and beside) aircraft 100, such as without limitation a B-1 fold. In some cases, at least a hinge 120*a-b* may allow at least a wing 120*a-b* to twist and fold, such without limitation a Grumman fold.

Still referring to FIG. 1, in some embodiments, aircraft 100 may include at least an outboard flight component 124*a-b*. As used in this disclosure, an "outboard flight component" is a flight component that is located substantially outboard (i.e., nearer a wing tip) of a hinge 120*a-b*. In some cases, an outboard flight component 124*a-b* may be located on at least a wing 112*a*. Outboard flight component 124*a-b* may include any flight component described in this disclosure, including flight components described in detail in FIG. 5. For example, in some cases, an outboard flight component 124*a-b* may include light sources, flight control surfaces, and the like.

Figure 2:
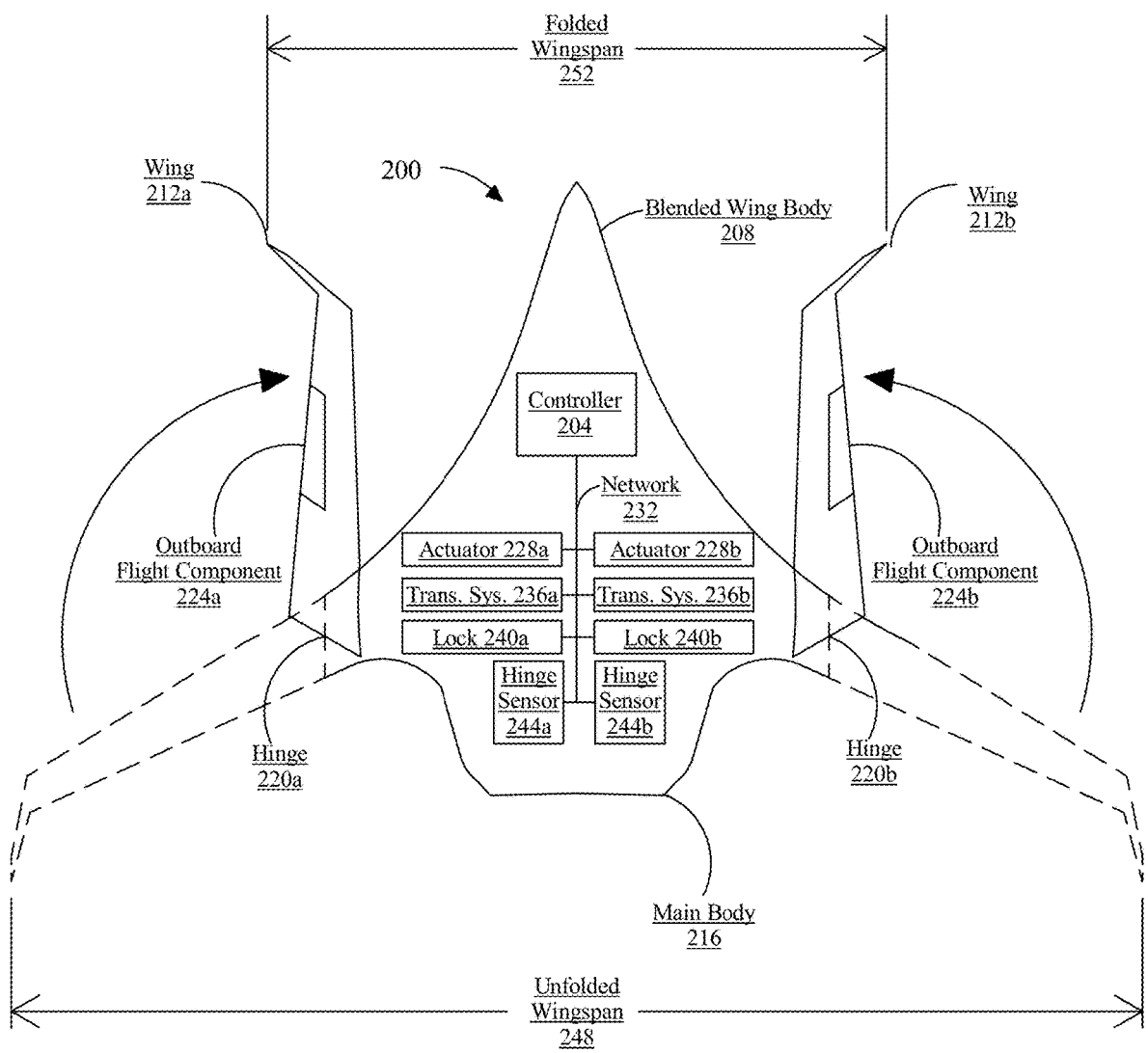
FIG. 2 is a block diagram illustrating an exemplary aircraft with forward foldable wings.

Referring now to FIG. 2, an exemplary aircraft 200 is represented with forward foldable wings. Exemplary aircraft 200 may include a controller 204, a blended wing body 208, at least a wing 212*a-b*, a main body 116, at least a hinge 220*a-b*, and at least an outboard flight component 224*a-b* consistent with description throughout this disclosure, including above with reference to FIG. 1. Additionally, aircraft 200 may include an actuation system (i.e., actuator) 228*a-b*. As used in this disclosure, an "actuation system" or "actuator" is a system that is configured to provide power (i.e., effort [force, torque, pressure, etc.] and flow [velocity, rotation velocity, volumetric flow, etc.]), work, or energy to generate a movement. In some cases, an actuation system 228*a-b* may be mechanically communicative with a hinge and provide power, work, or energy to move the hinge. In some cases, an actuating system may be configured to fold at least a wing 212*a-b*.

With continued reference to FIG. 2, an actuator 228*a-b* may include a component of a machine that is responsible for moving and/or controlling a mechanism or system. An actuator 228*a-b* may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator 228*a-b* responds by converting source power into mechanical motion. In some cases, an actuator 228*a-b* may be understood as a form of automation or automatic control.

With continued reference to FIG. 2, in some embodiments, actuator 228*a-b* may include a hydraulic actuator. A hydraulic actuator may consist of a cylinder or fluid motor that uses hydraulic power to facilitate mechanical operation. Output of hydraulic actuator 228*a-b* may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 2, in some embodiments, actuator 228*a-b* may include a pneumatic actuator 228*a-b*. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 2, in some cases, actuator 228*a-b* may include an electric actuator. Electric actuator 228*a-b* may include any of electromechanical actuators, linear motors, and the like. In some cases, actuator 228*a-b* may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator 228*a-b* may include a linear motor. Linear motors 228*a-b* may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors 228*a-b* may controlled be directly controlled by a control signal for controlling one or more linear motor parameters. Exemplary linear motor parameters include without limitation position, force, velocity, potential, and current.

With continued reference to FIG. 2, in some embodiments, an actuator 228*a-b* may include a mechanical actuator 228*a-b*. In some cases, a mechanical actuator 228*a-b* may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, worm gears, driveshafts, rails, pulleys, cables, linkages, and the like. In some cases, mechanical actuator may include a gear box. Exemplary gear boxes include planetary gear boxes. In some cases, mechanical actuator may include non-circular gears, which have a variable gear ratio over angular position of the non-circular gear. In some embodiments, actuator 228*a-b* may include a harmonic drive. A harmonic drive may also be referred to as strain wave gearing. "Harmonic drive," as used in this disclosure is a type of mechanical gear box that uses a flexible spline with external teeth; the flexible spline is deformed by a rotating plug (often non-circular) to engage with internal gear teeth of an outer spline. In some cases, rotating plug may include an elliptical rotating plug. In some cases, harmonic drive may have a number of advantages including no backlash, compactness and light weight (planetary arrangement), high gear ratios, reconfigurable ratios within a standard housing, good resolution and excellent repeatability (linear representation) when repositioning inertial loads, high torque capability, and coaxial input and output shafts (planetary arrangement). In some cases, harmonic drive may be able to achieve high gear reduction ratios in a relatively small space (e.g., a ratio from 30:1 up to 320:1 is possible in a volume in which planetary gears would typically only produce a 10:1 ratio).

With continued reference to FIG. 2, a controller 204 may be configured to control actuation system 228a-b. For example, in some case, controller 204 may be in communication with actuation system 228a-b. Controller 204 may be in communication with actuation system 228a-b by way of one or more networks 232, such as a controller area network (CAN) 232. Controller 204 may send at least a control signal to actuation system 228a-b in order to control the actuation system. "Control signal," as used in this disclosure, is a signal that represents information capable of or intended to control a device. Control signal may communicate an actuator 228a-b to fold and/or unfold wings 1124a-b. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device, such as controller 204, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 2, in some cases, controller 204 and/or hinge sensor 244a-b may perform one or more signal processing steps on a signal. For instance, controller 204 and/or hinge sensor 244a-b may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 2, in some embodiments, aircraft 200 may include at least a transmission system 236a-b. As used in this disclosure, a "transmission system" is a system that is configured to facilitate communication with an outboard flight component 224a-b, for example communication may include fluidic communication, mechanical communication, hydraulic communication, electrical communication and the like. In some cases, transmission system 228a-b may be configured to transmit power to an outboard flight component 224a-b. In some cases, at least a transmission system 228a-b may be configured to communicate with outboard flight component 228a-b and permit folding of at least a wing 212a-b. For example, commonly aircraft systems for communication and power transmission involve cables, wires, tubing, hose, linkages, and the like. These transmission systems in order to service an outboard flight component 224a-b must traverse at least a hinge 220a-b to access a foldable (i.e., distal) portion of at least a wing 212a-b. Transmission system 236a-b in some cases permits moving of wings 212a-b without interruption of communication to outboard flight component 224a-b. For example, in some cases, transmission system 236a-b may include at least a service loop, which is configured to prevent the transmission system from interfering with motion of at least a wing 212a-b, when wing is folded and/or unfolded. As sued in this disclosure, a "service loop" is an extra length of wire, cable, conduit, tubing, hose, or the like. In some cases, a service loop may be included in transmission system for neatness, accessibility, freedom of movement or future serviceability. Alternatively or additionally, in some cases, transmission system 236a-b may interrupt communication with an outboard flight component 224a-b as a function of a folded state (e.g., folded or unfolded) of at least a wing 212a-b. For example, in some cases a transmission system 236a-b may include a connection, which may be disconnected when at least a wing 212a-b is folded.

With continued reference to FIG. 2, transmission system 236 may include a wireless communication component. For the purposes of this disclosure a "wireless communication component" is a device that transmits communications wirelessly from one device to another. As a non-limiting example, in some embodiments, wireless communication component may transmit communications to outboard flight component 224a-b. As another non-limiting example, wireless communication component may transmit commands from controller 204 to outboard flight component 224. In some embodiments, wireless communication component may use radio communication to communicate with outboard flight component 224a-b. In some embodiments, wireless communication component may use a line-of-sight communication method to communicate with outboard flight component 224a-b. For the purposes of this disclosure, a "line-of-sight communication method" is a communication method that relies on a line of sight between two devices to carry out communications between those two devices. As non-limiting examples, line-of-sight communication method may include laser communication, lidar communication, Li-Fi, and the like. In some embodiments, outboard flight component 224a-b may include a second wireless communication component with which it may receive the communications from the wireless communication component of the transmission system 236.

Still referring to FIG. 2, in some embodiments, aircraft 200 may include at least a lock 240a-b. At least a lock 240a-b may be configured to arrest motion of at least a wing 212a-b, for example when the at least a wing is folded and/or unfolded. As used in this disclosure, a "lock" is device that is configured to arrest movement. In some cases, a lock may include a mechanism. Exemplary locking mechanisms include pawls, pins, threaded fasteners, gears, worm gears, springs, linkages, and the like. system of claim 1, further comprising a lock configured to arrest movement of the hinge. In some cases, at least a lock 240a-b may be further configured to resist one or more of wing moments and wing forces. Exemplary wing moments and wing forces include without limitation wing bending moments, wing torsional moments, and wing shear moments. In some cases, wing moments and wing forces may result from one or more of drag, thrust, and lift acting on wing, for example during flight. In some cases, wing moments and wing may result from more episodic loadings, such as those resulting from turbulence during flight. In an exemplary embodiment, at least a lock 240a-b may include interlaced fingers, which are aligned when wings an unfolder. Interlaced fingers may include through holes allowing for locking pins to be placed through interlaced fingers, thereby substantially preventing motion of the interlaced fingers relative one another. In some cases, locking pins may be placed through interlaced fingers in a direction that is substantially orthogonal to hinged movement of the fingers during folding.

Still referring to FIG. 2, in some embodiments, aircraft 200 may include at least a hinge sensor 244a-b. In some cases, at least a hinge sensor 244a-b may be in communication with controller 204. Hinge sensor 244a-b may be configured to detect a hinge phenomenon and transmit hinge data to controller 204 as a function of the hinge phenomenon. As used in this disclosure, a "hinge sensor" is a device configured to detect a phenomenon associated directly or indirectly with a hinge. Hinge sensor may communicate hinge data as a function of a detected phenomenon. For example, a hinge sensor may transduce hinge data from detected phenomenon. In some cases, hinge data may be represented by way of a signal, such as without limitation a hinge signal. "Hinge signal," as used in this disclosure, is a signal that represents hinge data. Hinge sensor 244a-b may include any sensor. Hinge signal may include any signal described in this disclosure, for example digital or analog. Exemplary sensors include positional sensors, motion sensors, temperature sensors, vibration sensors, and the like. In some cases, hinge sensor 244a-b may include a plurality of sensors or a sensor suite. In some cases, hinge sensor 244a-b may include a switch to determine a state of a hinge (e.g., folded or unfolded). In some cases, hinge sensor 244a-b may be configured to determine if a lock mechanism 240a-b is engaged. Hinge sensor 244a-b may include a proximity sensor, such as an ultrasound or Hall effect sensor. In some cases, hinge sensor 244a-b may detect an electrical phenomenon, for instance resistance, capacitance, and the like. In some cases, hinge sensor 244a-b may be configured to detect loading at a hinge 220a-b, a lock 240a-b, or another aircraft component. For instance, in some cases, hinge sensor 244a-b may include a strain gauge, a load cell, or the like.

Still referring to FIG. 2, aircraft 200 can be shown to have an unfolded wingspan 248 which is substantially greater than folded wingspan 252. As described above, this may be advantageous as a smaller folded wingspan may be less than maximum permitted wingspan for various airports and thereby increase airport compatibility. In some cases, a blended wing body aircraft 200 may require a larger wingspan 248, however present airport terminals may not allow for wingspans over a certain length. By allowing blending wing body aircraft 200 to fold wings and thereby reduce wingspan, more airports may be utilized by this exciting and more efficient new aircraft type.

Figure 3:
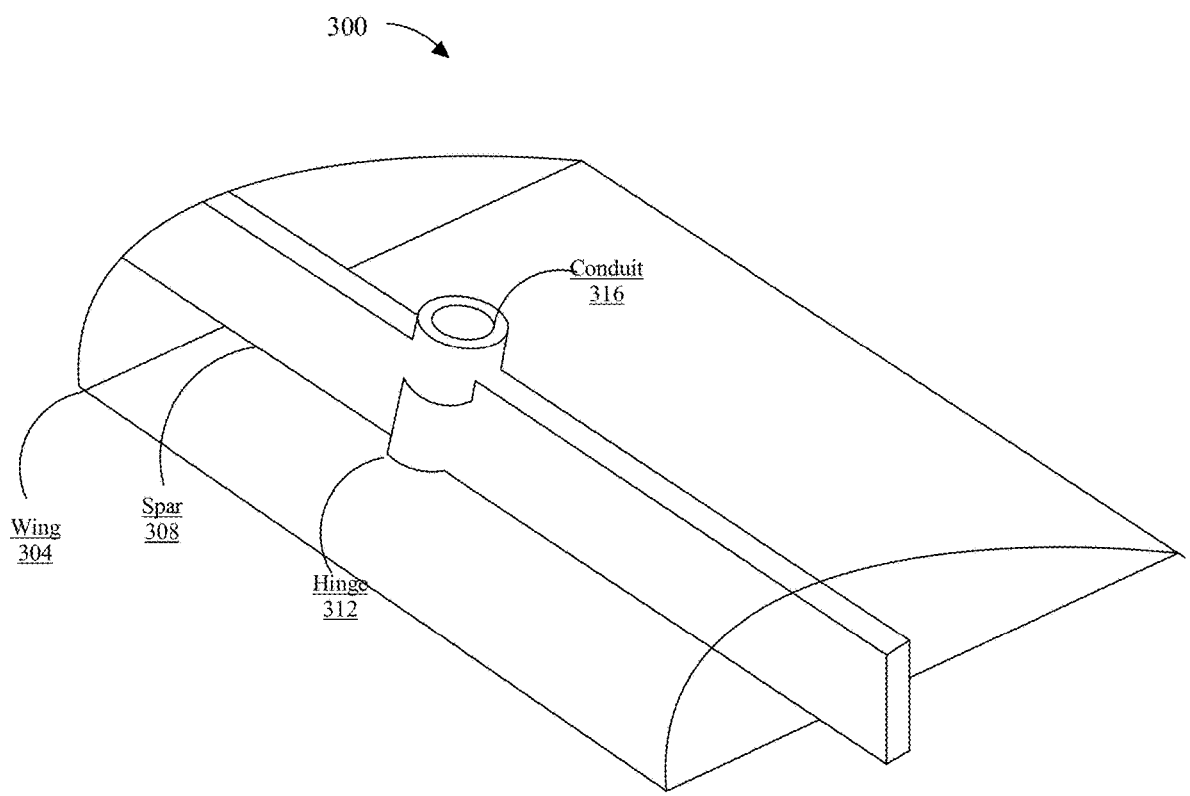
FIG. 3 is a schematic illustration of a section of an exemplary foldable wing.

Referring now to FIG. 3, a portion of an exemplary aircraft 300 is illustrated. A section of a wing 304 may be seen to include a spar 308. Spar 308 may include a structural member that runs substantially with or parallel to a surface of wing 304. For instance, spar 308 may include any structural material described in this disclosure, including without limitation aluminum, titanium, steel, stainless steel, wood, composites (e.g., fiberglass and/or carbon fiber), and the like. In some cases, spar 308 may include substantially two parts separated by a hinge 312. An exemplary hinge 312 is illustrated in FIG. 3. Exemplary hinge 312 may allow for rotation (i.e., folding) of wing 304 substantially forward (or aft) of aircraft 300. In some cases, hinge 312 may include a rotational bearing surface configured to provide for rotation of a wing 304 forward. Rotational bearing surface may include any bearing surface, for example rolling surfaces, sliding surfaces, and the like. Rotational bearing surface may include one or more bearing assemblies. Exemplary, non-limiting, bearing assemblies include roller bearings, needle bearings, ball bearings, cross-roller bearings, duplexed and/or multiplexed ball bearings, rotary stroke bearings which allow for rotational movement as well as translational movement, for example along an axis of rotation, and the like. An exemplary rotary-stroke bearing includes MahrMotion rotary-stroke bearings and ball cages from Mahr Metrology of Esslingen, Germany.

Still referring to FIG. 3, in some cases, hinge 312 may have a conduit 316 disposed substantially within rotational bearing surface. As used in this disclosure, a "conduit" is channel por passage through which material may be conveyed. In some cases, a conduit may be configured to convey at least a portion of transmission system. In some cases, conduit 316 may be configured to contain and/or convey at least a portion of transmission system. For example, in some cases, one or more of cables, wires, hoses, tubes, linkages, and the like may pass through conduit 316 from a first static portion of wing 304 to a second dynamic (i.e., foldable) portion of wing 304, thereby facilitating communication with outboard flight components. In some cases, transmission system may include an element to allow for rotational movement of wing without interference from transmission system. Some systems of transmission system may allow for communication of one or more of electrical, mechanical, fluidic, or communication signals and/or power over a rotational joint. An exemplary system may include a slip ring, which provides electrical and/or communication signals over a rotational joint through use of rotating electrical contacts. A "slip ring," as used in this disclosure, is an electromechanical device that allows the transmission of power, communication, and/or electrical signals from a stationary to a rotating structure. A slip ring can be used in any electromechanical system that requires rotation while transmitting power or signals. In some cases, a slip ring may be referred to as a rotary electrical interface, a rotating electrical connector, a collector, swivel, or electrical rotary joints.

Figure 4:
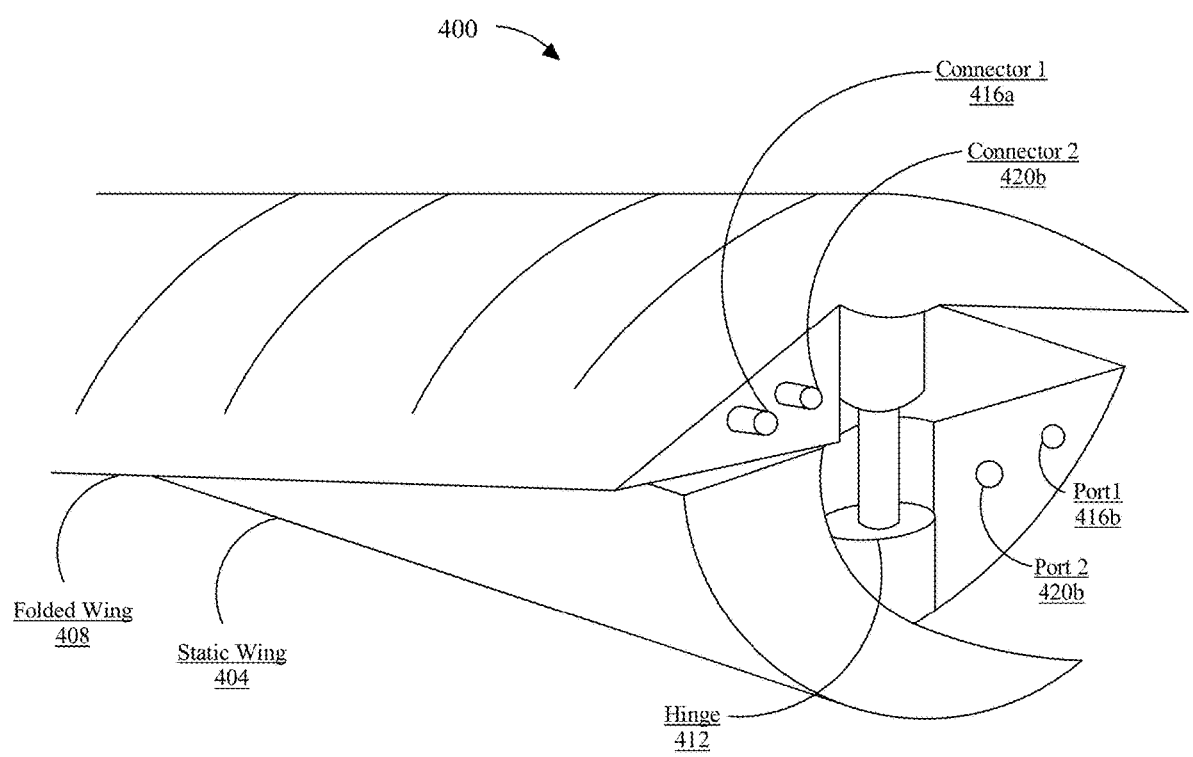
FIG. 4 is a schematic illustration of a section of an exemplary folded wing.

Referring now to FIG. 4, an exemplary portion of an aircraft 400 is illustrated. exemplary portion 400 may include a first static wing part 404 and a second dynamic (i.e., foldable) wing part 408. static wing 404 and foldable wing 408 may move relative one another at a hinge 412. Hinge 412 may allow dynamic wing 408 to rotate relative static wing 404. Additionally or alternatively, in some cases, hinge 412 may allow dynamic wing 408 to translate relative static wing 404. For example, as can be seen in FIG. 4, in some cases, folding wing may include translating dynamic wing 408, for instance along an axis of rotation of hinge, to prevent collision or interference between static wing 404 and dynamic wing 408. In some cases, hinge may facilitate translational motion by including one or more translational bearing elements, for example without limitation linear rails, linear guides, carriages, rotary stroke bearings, lead screws, and the like. In some cases, wing 404 and 408 may include at least a feature configured to transform rotational motion to translational motion. For instance, FIG. 4 illustrates at least a ramp surface on static wing 404 which causes dynamic wing 404 to translate upward when rotated. Transformational features may include any mechanical transformers, for example rotational motion to linear motion transformers, such as without limitation cams, cranks, linkages, rack and pinions, scotch yokes, and the like.

Still referring to FIG. 4, in some embodiments, a transmission system may include at least a connection that is configured to disconnect when the at least an arm is folded. As used in this disclosure, a "connection" is an element that may connect, attach, or otherwise join two components or sub-components. In some cases, a connection may be configured to selectably connect and/or disconnect under specific circumstances, for instance when unfolding and/or folding a wing. FIG. 4 illustrates 2 connections 416a-b and 420a-b each with a connector 416a and 420a and a port 416b and 420b. Connections 416a-b and 420a-b may include any selectably disconnectable communication system. For instance, connections 416a-b and 420a-b may include hydraulic connections, pneumatic connections, mechanical connections, electrical connections, and the like. Exemplary fluidic connections (e.g., hydraulic and/or pneumatic) include quick disconnect, cam lock connections, Schrader quick-disconnects, fluidic couplings, Lincoln quick-disconnects, and the like. In some cases, fluidic connections 416a-b and 420a-b may include one or more seals in order to seal the fluidic connection 416a-b and 420a-b when connected and/or disconnected. Exemplary seals include without limitation o-rings, gaskets, and the like. Seals may be arranged in a face seal arrangement and/or a piston seal arrangements. In some cases, seals may be loaded with a compliant force (e.g., spring loading) to ensure positive contact and/or designed seal squeeze. In some cases, connection 416a-b and 420a-b may include an electrical connection. Exemplary electrical connections 416a-b and 420a-b include without limitation pin and socket connections, quick-disconnect terminals, canted coil spring connections, pogo pin connections, and the like. In some cases, connections 416a-b and 420a-b may be automatically connected and/or disconnected, for example with motion achieved by actuator or by one or more other sub-systems. Alternatively or additionally, in some cases, connections 416a-b and 420a-b may be manually connected and/or disconnected.

Figure 5:
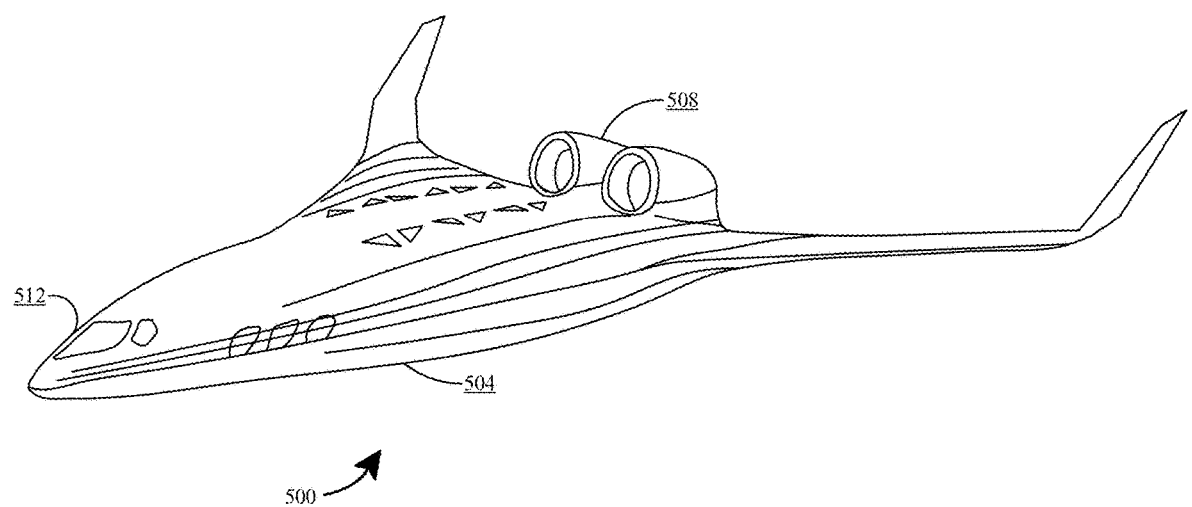
FIG. 5 is a schematic of an exemplary blended wing aircraft.

Referring to FIG. 5, an exemplary blended wing aircraft 500 is illustrated. Aircraft 500 may include a blended wing body 504. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft. For example, a BWB 504 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 504 design may or may not be tailless. One potential advantage of a BWB 504 may be to reduce wetted area and any accompanying drag associated with a conventional wing-body junction. In some cases, a BWB 504 may also have a wide airfoil-shaped body, allowing entire aircraft to generate lift and thereby facilitate reduction in size and/or drag of wings. In some cases, a BWB 504 may be understood as a hybrid shape that resembles a flying wing, but also incorporates features from conventional aircraft. In some cases, this combination may offer several advantages over conventional tube-and-wing airframes. In some cases, a BWB airframe 504 may help to increase fuel economy and create larger payload (cargo or passenger) volumes within the BWB. BWB 504 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 5, BWB 504 of aircraft 500 may include a nose portion. A "nose portion," for the purposes of this disclosure, refers to any portion of aircraft 500 forward of the aircraft's fuselage 516. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 5, BWB 504 may include at least a structural component of aircraft 500. Structural components may provide physical stability during an entirety of an aircraft's 500 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 500 structure, they may be so named A, B, C, and so on named from nose to tail. Pillars, like any structural element, may be disposed a distance away from each other, along an exterior of aircraft 500 and BWB 504. Depending on manufacturing method of BWB 504, pillars may be integral to frame and skin, comprised entirely of internal framing, or alternatively, may be only integral to structural skin elements. Structural skin will be discussed in greater detail below.

With continued reference to FIG. 5, BWB 504 may include a plurality of materials, alone or in combination, in its construction. At least a BWB 504, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 504 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 504 may additionally or alternatively use wood or another suitably strong yet light material for an internal structure.

With continued reference to FIG. 5, aircraft 500 may include monocoque or semi-monocoque construction. BWB 504 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 5, BWB 504 may include at least a fuselage. A "fuselage," for the purposes of this disclosure, refers to a main body of an aircraft 500, or in other words, an entirety of the aircraft 500 except for nose, wings, empennage, nacelles, and control surfaces. In some cases, fuselage may contain an aircraft's payload. At least a fuselage may comprise structural components that physically support a shape and structure of an aircraft 500. Structural components may take a plurality of forms, alone or in combination with other types. Structural components vary depending on construction type of aircraft 500 and specifically, fuselage. A fuselage 512 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 5, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 500. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 500 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 5, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 5, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 5, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 504. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 5, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 500 is in its level flight orientation or sitting on ground. A post may act similarly to stringer in that it is configured to support axial loads in compression due to a load being applied parallel to its axis due to, for example, a heavy object being placed on a floor of aircraft 500. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 5, aircraft 500 may include at least a flight component 508. A flight component 508 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 500 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 500. In some embodiments, at least a flight component 508 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 5, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 5, at least a flight component may be one or more devices configured to affect aircraft's 500 attitude. "Attitude", for the purposes of this disclosure, is the relative orientation of a body, in this case aircraft 500, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 500. A plurality of attitude datums may indicate one or more measurements relative to an aircraft's pitch, roll, yaw, or throttle compared to a relative starting point. One or more sensors may measure or detect an aircraft's 500 attitude and establish one or more attitude datums. An "attitude datum", for the purposes of this disclosure, refers to at least an element of data identifying an attitude of an aircraft 500.

With continued reference to FIG. 5, in some cases, aircraft 500 may include at least a pilot control. As used in this disclosure, a "pilot control," is an interface device that allows an operator, human or machine, to control a flight component of an aircraft. Pilot control may be communicatively connected to any other component presented in aircraft 500, the communicative connection may include redundant connections configured to safeguard against single-point failure. In some cases, a plurality of attitude datums may indicate a pilot's instruction to change heading and/or trim of an aircraft 500. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 500. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 508 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 5, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 508. At least a flight component 508 may include any propulsor as described herein. In embodiment, at least a flight component 508 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 5, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 5, at least a flight component 508 may include wings, empennages, nacelles, control surfaces, fuselages, and landing gear, among others, to name a few. In embodiments, an empennage may be disposed at the aftmost point of an aircraft body 504. Empennage may comprise a tail of aircraft 500, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 500 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 500 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 504 aircraft 500 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 508 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 508 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 500. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 500 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 5, aircraft 500 may include an energy source. Energy source may include any device providing energy to at least a flight component 508, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 5, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 504 of aircraft 500, for example without limitation within a wing portion 512 of blended wing body 508. Aviation fuels may include petroleum-based fuels, or petroleum and synthetic fuel blends, used to power aircraft 500. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 500. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 5, modular aircraft 500 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 5, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 5 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 5, aircraft 500 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 5, aircraft 500 may include multiple flight component 508 sub-systems, each of which may have a separate energy source. For instance, and without limitation, one or more flight components 508 may have a dedicated energy source. Alternatively, or additionally, a plurality of energy sources may each provide power to two or more flight components 508, such as, without limitation, a "fore" energy source providing power to flight components located toward a front of an aircraft 500, while an "aft" energy source provides power to flight components located toward a rear of the aircraft 500. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 508. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 5, aircraft 500 may include a flight component 508 that includes at least a nacelle 508. For the purposes of this disclosure, a "nacelle" is a streamlined body housing, which is sized according to that which is houses, such as without limitation an engine, a fuel store, or a flight component. When attached by a pylon entirely outside an airframe 504 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 500 partially or wholly enveloped by an outer mold line of the aircraft 500. At least a nacelle may be designed to be streamlined. At least a nacelle may be asymmetrical about a plane comprising the longitudinal axis of the engine and the yaw axis of modular aircraft 500.

With continued reference to FIG. 5, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 5, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 5, in nonlimiting embodiments, at least a flight component 508 may include an airbreathing engine such as a jet engine, turbojet engine, turboshaft engine, ramjet engine, scramjet engine, hybrid propulsion system, turbofan engine, or the like. At least a flight component 508 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 5, an aircraft 500 may include a flight controller. As used in this disclosure, a "flight controller" is a device that generates signals for controlling at least a flight component 508 of an aircraft 500. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 5, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 500 and/or computing device.

With continued reference to FIG. 5, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
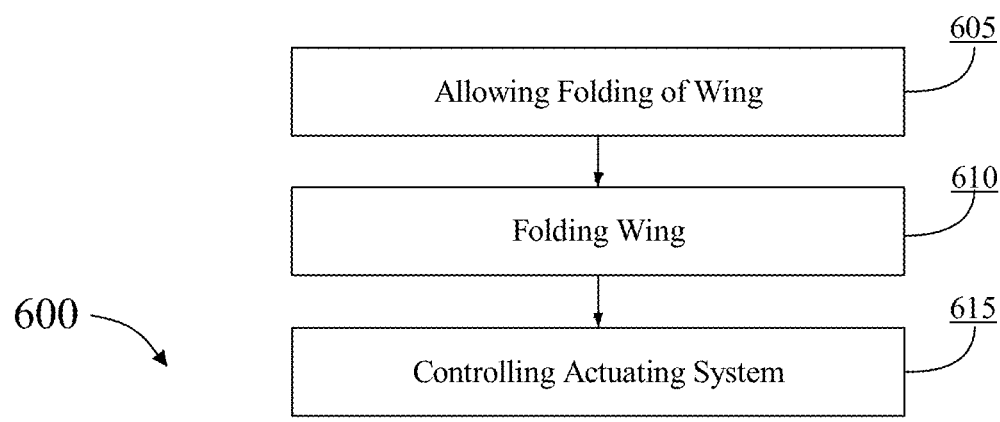
FIG. 6 is a flow diagram of an exemplary method of folding wings on an aircraft.

Referring now to FIG. 6, a method 600 of folding wings on an aircraft is illustrated by way of a flow diagram. In some cases, aircraft may include a blended wing body, where the blended wing body comprises a main body and at least a wing. aircraft may include any aircraft described in this disclosure, for example describe with reference to FIGS. 1-5. Blended wing body may include any blended wing body described in this disclosure, for example describe with reference to FIGS. 1-5. Wing may include any wing described in this disclosure, for example describe with reference to FIGS. 1-5. Main body may include any main body described in this disclosure, for example describe with reference to FIGS. 1-5. At step 605, method 600 may include allowing, using a hinge, folding of at least a wing. Hinge may include any hinge described in this disclosure, for example describe with reference to FIGS. 1-5.

With continued reference to FIG. 6, at step 610 method 600 may include folding, using an actuation system, at least a wing. Actuation system may include any actuation system described in this disclosure, for example describe with reference to FIGS. 1-5.

With continued reference to FIG. 6, at step 615 method 600 may include controlling, using a controller, at least an actuation system. Controller may include any controller described in this disclosure, for example describe with reference to FIGS. 1-5 and 7.

Still referring to FIG. 6, in some embodiments, blended wing body may additionally include at least a transitional portion disposed substantially between at least a wing and main body; and the at least a wing is located substantially outboard of the at least a transitional portion. Transitional portion may include any transitional portion described in this disclosure, for example describe with reference to FIGS. 1-5. In some embodiments of method 600, at least a wing may include at least an outboard flight component located substantially outboard of hinge. Outboard flight component may include any outboard flight component described in this disclosure, for example describe with reference to FIGS. 1-5.

Still referring to FIG. 6, in some embodiments, method 600 may additionally include communicating, using a transmission system, with outboard flight component and permitting, using the transmission system, folding of at least a wing. Transmission system may include any transmission system described in this disclosure, for example describe with reference to FIGS. 1-5. In some cases, method 600 may additionally include disconnecting, using transmission system, at least a connection when at least a wing is folded. Connection may include any connection described in this disclosure, for example describe with reference to FIGS. 1-5. In some embodiments, method 600 may additionally include not interfering, using at least a service loop of transmission system, with movement of at least a wing during folding. Service loop may include any service loop described in this disclosure, for example describe with reference to FIGS. 1-5. In some cases, method may additionally include providing rotation, using a rotational bearing surface of hinge, of at least a wing forward and containing, using a conduit disposed substantially within the rotational bearing surface, at least a portion of transmission system. Rotational bearing surface may include any rotational bearing surface described in this disclosure, for example describe with reference to FIGS. 1-5. Conduit may include any conduit described in this disclosure, for example describe with reference to FIGS. 1-5.

Still referring to FIG. 6, method 600 may additionally include arresting, using a lock, movement of hinge. Lock may include any lock described in this disclosure, for example describe with reference to FIGS. 1-5. In some cases, method 600 may additionally include resisting, using lock, one or more of wing moments and wing forces. Wing moments may include any wing moments described in this disclosure, for example describe with reference to FIGS. 1-5. Wing forces may include any wing forces described in this disclosure, for example describe with reference to FIGS. 1-5.

Still referring to FIG. 6, in some embodiments, method 600 may additionally include detecting, using at least a hinge sensor in communication with controller, a hinge phenomenon and transmitting, using the at least a hinge sensor, hinge data to the controller as a function of the hinge phenomenon. Hinge sensor may include any sensor described in this disclosure, for example describe with reference to FIGS. 1-5. Hinge phenomenon may include any phenomenon described in this disclosure, for example describe with reference to FIGS. 1-5. Hinge data may include any data described in this disclosure, for example describe with reference to FIGS. 1-5.

Still referring to FIG. 6, in some embodiments, method 600 may additionally include wirelessly communicating, using a transmission system, with the outboard flight component. This may be implemented as described with reference to FIGS. 1-5. In some embodiments, the transmission system may include a wireless communication component configured to transmit communication to the outboard flight component. In some embodiments, wirelessly communicating, using the transmission system, with the outboard flight component may include transmitting communication to the outboard flight component using a line-of-sight communication method. In some embodiments, wirelessly communicating, using the transmission system, with the outboard flight component may include transmitting communication to the outboard flight component using radio communication.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
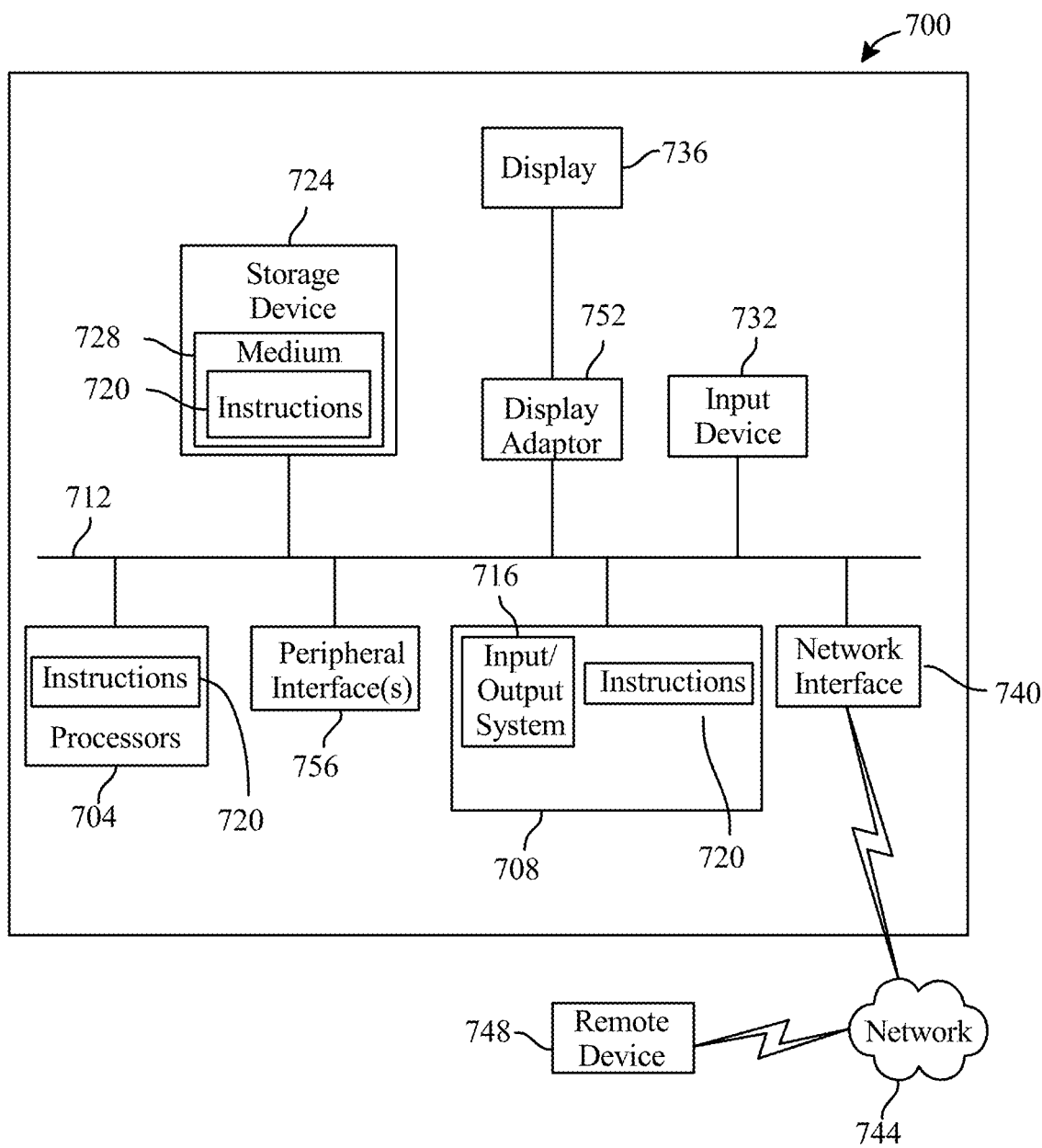
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for folding wings on an aircraft, the system comprising:
    a blended wing body, wherein the blended wing body comprises:
        a main body; and
        at least a wing comprising an outboard flight component, wherein the outboard flight component comprises at least a flight control surface;
    a hinge located on the blended wing body and configured to allow folding of the at least a wing, wherein the hinge is inboard relative to the outboard flight component;
    an actuation system configured to fold the at least a wing;
    a controller configured to control the at least an actuation system; and
    a transmission system comprising a connection wherein the connection disconnects as a function of folding of the at least a wing.

2. The system of claim 1, wherein the at least a connection comprises a selectably disconnectable communication system.

3. The system of claim 1, wherein the at least a connection comprises a fluidic connection.

4. The system of claim 1, wherein the at least a connection comprises an electrical connection.

5. The system of claim 1, wherein the transmission system is configured to facilitate communication with the outboard flight component, wherein the transmission system comprises a wireless communication component configured to transmit communication to the outboard flight component.

6. The system of claim 5, wherein the wireless communication component is further configured to transmit communication to the outboard flight component using a line-of-sight communication method.

7. The system of claim 5, wherein the wireless communication component is further configured to transmit communication to the outboard flight component using radio communication.

8. The system of claim 1, further comprising a transmission system, wherein the transmission system comprises a slip ring.

9. The system of claim 1, further comprising a transmission system, wherein the hinge comprises a conduit, wherein the conduit is configured to contain at least a portion of the transmission system.

10. A method of folding wings on an aircraft comprising a blended wing body, wherein the blended wing body comprises a main body and at least a wing, the method comprising:
    allowing, using a hinge located on the blended wing body and inboard relative to an outboard flight component of the at least a wing, folding of the at least a wing, wherein the outboard flight component comprises at least a flight control surface;
    folding, using an actuation system, the at least a wing;
    controlling, using a controller, the at least an actuation system; and
    disconnecting a connection of a transmission system as a function of folding of the at least a wing.

11. The method of claim 10, wherein the at least a connection comprises a selectably disconnectable communication system.

12. The method of claim 10, wherein the at least a connection comprises a fluidic connection.

13. The method of claim 10, wherein the at least a connection comprises an electrical connection.

14. The method of claim 10, further comprising wirelessly communicating, using the transmission system, with the outboard flight component, wherein the transmission system comprises a wireless communication component configured to transmit communication to the outboard flight component.

15. The method of claim 14, wherein wirelessly communicating, using the transmission system, with the outboard flight component comprises transmitting communication to the outboard flight component using a line-of-sight communication method.

16. The method of claim 14, wherein wirelessly communicating, using the transmission system, with the outboard flight component comprises transmitting communication to the outboard flight component using radio communication.

17. The method of claim 10, further comprising communicating, using a transmission system, with the outboard flight component, wherein the transmission system comprises a slip ring.

18. The method of claim 10, further comprising communicating, using a transmission system, with the outboard flight component, wherein the hinge comprises a conduit, wherein the conduit is configured to contain at least a portion of the transmission system.

* * * * *